(12) United States Patent
Hall

(10) Patent No.: US 12,397,864 B1
(45) Date of Patent: Aug. 26, 2025

(54) CONVERTIBLE TRAILER

(71) Applicant: Nicholas Ryan Hall, Runaway Bay, TX (US)

(72) Inventor: Nicholas Ryan Hall, Runaway Bay, TX (US)

(*) Notice: Subject to any disclaimer, the term of this patent is extended or adjusted under 35 U.S.C. 154(b) by 0 days.

(21) Appl. No.: 18/999,518

(22) Filed: Dec. 23, 2024

(51) Int. Cl.
| | |
|---|---|
| *B62D 33/02* | (2006.01) |
| *B60P 1/02* | (2006.01) |
| *B60P 3/08* | (2006.01) |
| *B62D 33/10* | (2006.01) |
| *B62D 53/06* | (2006.01) |
| *B62D 63/06* | (2006.01) |

(52) U.S. Cl.
CPC ............ *B62D 33/10* (2013.01); *B60P 1/02* (2013.01); *B60P 3/08* (2013.01); *B62D 33/02* (2013.01); *B62D 53/062* (2013.01); *B62D 63/068* (2013.01)

(58) Field of Classification Search
CPC ........ B62D 33/02; B62D 33/08; B62D 33/10; B62D 53/06; B62D 53/061; B62D 53/062; B62D 63/06; B62D 63/068; B60P 1/02; B60P 1/025; B60P 3/06; B60P 3/08
USPC ....... 280/6.151, 6.15, 30, 43.23, 415.1, 789, 280/423.1, 418, 418.1, 475; 296/25, 296/182.1, 184.1; 414/495; 410/26, 27, 410/28, 28.1, 29.1
See application file for complete search history.

(56) References Cited

U.S. PATENT DOCUMENTS

| | | | | | |
|---|---|---|---|---|---|
| 2,687,225 | A | * | 8/1954 | Martin | B60P 3/07 280/491.1 |
| 2,904,340 | A | * | 9/1959 | Simpson | B60P 7/12 280/789 |
| 4,290,642 | A | * | 9/1981 | Wise | B62D 53/062 280/43.11 |
| 4,806,065 | A | * | 2/1989 | Holt | B62D 53/065 280/425.2 |
| 5,246,241 | A | * | 9/1993 | Baver | B60P 1/6481 280/789 |
| 6,343,825 | B1 | * | 2/2002 | Gee | B62D 53/062 280/789 |
| 6,497,541 | B2 | * | 12/2002 | Pawluk | B60P 3/08 410/27 |
| 9,199,568 | B2 | * | 12/2015 | Dibdin | B60P 1/02 |
| 11,752,914 | B1 | * | 9/2023 | Biagi | B60P 1/6418 414/495 |

(Continued)

*Primary Examiner* — Keith J Frisby
(74) *Attorney, Agent, or Firm* — Plager Schack LLP; Mark H. Plager; Kara K. Verryt

(57) ABSTRACT

A trailer convertible between step deck trailer and flatbed trailer configurations includes a frame, wheel and axle assemblies supported on the frame, an upper deck at the front of the frame, a lower deck configured for vertical movement on a vertical slide rail from a first step deck position to a second raised flatbed position wherein the lower deck and the upper deck are coplanar; a controller actuatable for upward and downward movement of the lower deck; at least one locking support beam; and landing gear deployable to support the convertible trailer while it is parked for loading. An air lift jack assembly is configured to raise the lower deck, and an air pressure release valve is configured to release air pressure to lower the lower deck, in response to actuation of the controller. The wheel and axle assemblies may be configured for forward-backward movement and/or upward-downward movement.

13 Claims, 2 Drawing Sheets

(56) References Cited

U.S. PATENT DOCUMENTS

| | | | |
|---|---|---|---|
| 2008/0001130 A1* | 1/2008 | Dibdin | B66F 7/085 |
| | | | 414/495 |
| 2010/0289248 A1* | 11/2010 | Cesternino | B62D 53/062 |
| | | | 280/425.2 |
| 2018/0057081 A1* | 3/2018 | O'Marra | B62D 53/067 |
| 2020/0180491 A1* | 6/2020 | Das | B62D 63/08 |
| 2021/0261031 A1* | 8/2021 | Bell | B60P 1/025 |

* cited by examiner

CONVERTIBLE TRAILER

FIELD AND BACKGROUND OF THE INVENTION

The embodiments herein relate generally to step deck trailers, and more particularly to a step deck trailer configured to function as a flatbed trailer.

Step deck trailers and flatbed trailers are used to haul different types of loads. Step deck trailers may be used to haul loads that flatbed trailers are not able to haul, and vice versa. This may cause transportation problems when picking up various types of loads as commercial hauling companies would need two different trailers for commercial hauling to accommodate different types of loads.

Companies having only one type of trailer may be turned away from opportunities to haul loads the trailer is not designed to haul. When a company and a driver are turned away, it results in wasted fuel, more downtime, more money spent, and potential delivery delay.

Having two types of trailers does not offer an adequate solution, as maintaining two types of trailers increases costs. Extra round trips to bring an alternative trailer may still be required and may impact loading and delivery, which can be problematic for time-sensitive schedules. Delaying a time-sensitive scheduled loading and delivery may cost time and money and may impact safety of the transport.

Therefore, what is needed is a solution to one or more of these problems affecting both providers and receivers of hauling services.

SUMMARY OF THE INVENTION

A trailer convertible between a step deck trailer and flatbed trailer includes a trailer frame, wheel and axle assemblies supported on the trailer frame, an upper deck at the front of the trailer frame, a lower deck configured for vertical movement on a vertical slide rail from a first step deck position to a second raised flatbed position, wherein the lower deck and the upper deck are coplanar; a controller actuatable for upward and downward movement of the lower deck; at least one locking support beam; and landing gear deployable to support the convertible trailer while it is parked for loading. An air lift jack assembly is configured to raise the lower deck, and an air pressure release valve is configured to release air pressure to lower the lower deck, in response to actuation of the controller. The wheel and axle assemblies may be configured for forward-backward movement and/or upward-downward movement for storage. A dovetail loading ramp may be reversibly deployed for use by outwardly pivoting a first dovetail ramp portion. A flip-top deck extension may be reversibly deployed to extend the lower deck by outwardly pivoting a flip-top deck top portion to a deployed position level with the lower deck.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the present disclosure include a step deck trailer configured to function as a flatbed trailer, and may comprise the following elements related in the following exemplary fashion. This list of possible constituent elements and their interrelation described herein are intended to be exemplary only, and are not intended to be used to limit the trailer apparatus of the present application to just these elements or to limit the scope or nature of the relationships between the various elements. Persons having ordinary skill in the art relevant to the present disclosure may understand there to be equivalent elements that may be substituted within the present disclosure without changing the essential function or operation of the apparatus. The following examples are presented as illustrative examples only.

Figure 1:
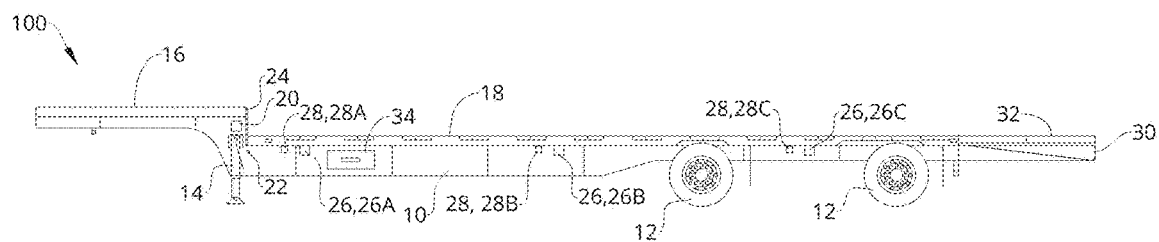
FIG. 1 is a schematic right side view of the invention configured for use as a step deck trailer, wherein the left side is a substantially identical mirror image of the right side.
Figure 2:
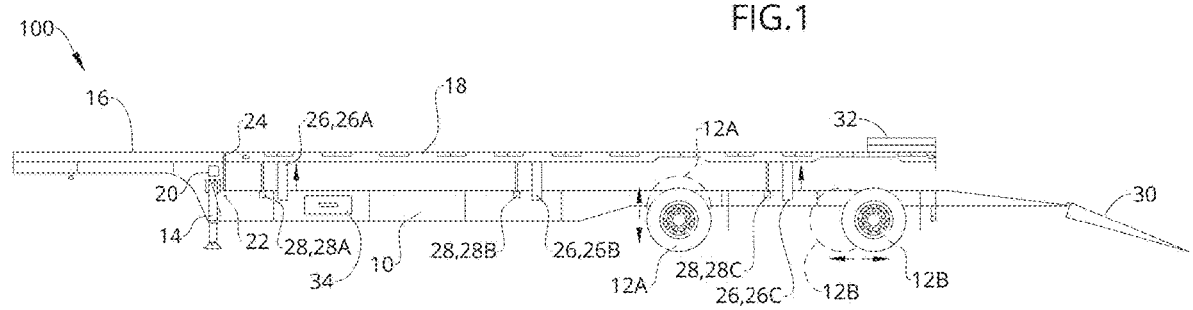
FIG. 2 is a schematic side view of the invention configured for use as a flat deck trailer, wherein the left side is a substantially identical mirror image of the right side.

Referring initially to FIGS. 1-2, a convertible trailer 100 is constructed and arranged for conversion from a step deck trailer configuration as shown at FIG. 1, to a flatbed trailer configuration as shown at FIG. 2. The convertible trailer 100 has a trailer front, a trailer rear, a trailer right side, a trailer left side, a trailer top, and a trailer bottom. The convertible trailer 100 comprises a trailer frame 10 having a frame front, a frame rear, a frame right side, a frame left side, a frame top, and a frame bottom.

Figure 3:
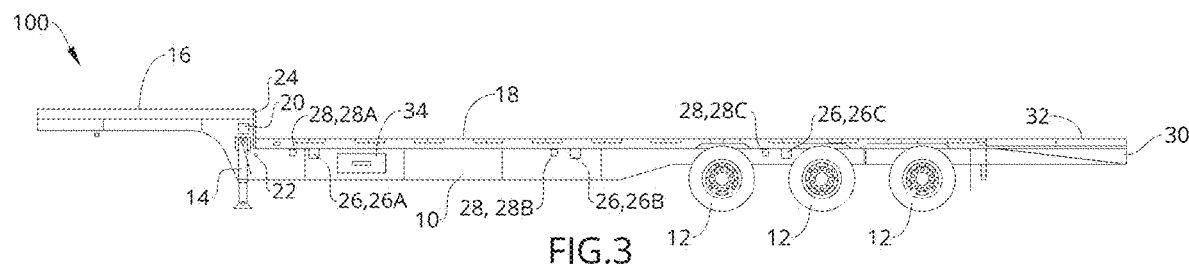
FIG. 3 is a schematic side view of the invention having three wheel and axle assemblies, wherein the left side is a substantially identical mirror image of the right side.
Figure 4:
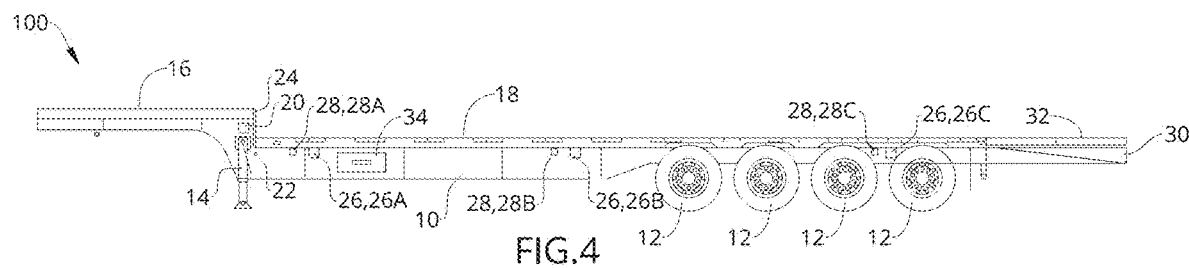
FIG. 4 is a schematic side view of the invention having four wheel and axle assemblies, wherein the left side is a substantially identical mirror image of the right side.

A plurality of wheel and axle assemblies 12 are supported on the trailer frame 10. Each wheel and axle assembly 12 of the plurality of wheel and axle assemblies 12 comprises a pair of wheels rotatably mounted on an axle. At least one wheel and axle assembly 12 of the plurality of wheel and axle assemblies 12 may comprise an air lift wheel and axle assembly 12A having a pair of air lift wheels rotatably mounted on an air lift axle configured to raise the pair of air lift wheels from a lowered wheel position permitting the pair of air lift wheels to contact a ground or paved surface to a raised wheel position. At least one wheel and axle assembly 12 of the plurality of wheel and axle assemblies 12 may further comprise an advancing axle assembly 12B having an advancing axle configured for selective forward and backward movement of the pair of wheels rotatably mounted on the advancing axle between a rearward wheel position and a forward wheel position. With reference to FIGS. 3 and 4, the plurality of wheel and axle assemblies 12 may comprise any number of wheel and axle assemblies, such as three or four wheel and axle assemblies. Referring again to FIGS. 1 and 2, an upper deck 16 is located at the frame front of the trailer frame 10. A lower deck 18 is located rearward of the upper deck 16 and is constructed and arranged for vertical movement on a vertical slide rail 24 from a first step deck position to a second raised flatbed position wherein the lower deck 18 and the upper deck 16 are coplanar. A controller 20 is operably connected to the lower deck 18 and configured for actuation to move the lower deck 18 upward and downward on the vertical slide rail 24 with respect to the upper deck 16 to provide a flatbed trailer configuration. The controller 20 may be operably connected to a stationary air lift remote control with stationary built in cables. An air lift jack assembly 28 is operably connected to the controller 20, the lower deck 18, and the vertical slide rail 24 and is configured to raise the lower deck 18 to the level of the upper deck 16 in response to actuation of the controller 20. The air lift jack assembly may include at least one pair of air lift jacks, such as a right front air lift jack and a left front air lift jack 28A, a right intermediate air lift jack 28B and a left intermediate air lift jack 28B, and a right rear air lift jack 28C and a left rear air lift jack. The air lift jack assembly 28 may further comprise air cylinders, pistons, rods, barrels, and seals, and may be operably connected to sealed high-pressure fittings and hose connections necessary for operation of the air lift jack assembly 28. An air pressure release valve 22, such as an emergency relief valve, is operably connected to the controller 20, the lower deck 18, the vertical slide rail 24, and the air lift jack assembly 28 and is configured to release air pressure in response to actuation by the controller 20 to lower the lower deck 18. The convertible trailer may include spring-action steel teeth hooks configured to support the weight of the lower deck 18 so the air lift jack 28 is not in use at all times under a load. While the lower deck 18 is being raised, the spring action steel teeth hooks operate and engage to support the lower deck 18 at each point of its ascent. Once the lower deck 18 has completed its ascent to a desired intermediate position or has raised completely to have a lower deck upper surface coplanar with an upper deck upper surface, the spring action steel teeth hooks will stay in a last open position, allowing an operator to push a control button on the controller 20 or an operably connected remote control to a down position to permit the lower deck 18 to rest on the spring action steel teeth hooks. When lowering the lower deck 18, the operator may raise the lower deck 18 to the fully raised position (i.e., to the flatbed configuration of the convertible trailer 100), turn the spring action steel teeth hooks to a position enabling the lower deck 18 to be lowered, depress a down button on the controller 20 or an operably connected remote control to lower the lower deck 18, or disengage the air pressure release valve 22 to lower the lower deck 18. After the lower deck 18 is lowered, the air pressure release valve 22 is closed to ensure no debris may enter it.

At least one pair of self-extending locking support beams 26, such as a right front locking support beam 26A and a left front locking support beam 26A, a right intermediate locking support beam 26B and a left intermediate locking support beam 26B, and a right rear locking support beam and a left rear locking support beam, extend when the lower deck 18 is raised to the flatbed configuration. Each front, intermediate and rear locking support beam 26A,26B,26C may be proximal to a front, intermediate and rear air lift jack 28A,28B,28C, and are configured to reversibly lock in place when fully extended to support the lower deck 18 in the flatbed configuration, and to automatically retract as the lower deck 18 is lowered to the step deck configuration. Landing gear 14 includes a right landing gear 14 mounted to an underside of the upper deck 16 at the trailer right side and a left landing gear 14 mounted to an underside of the upper deck 16 at the trailer left side, the right landing gear 14 and the left landing gear 14 being deployable from a raised storage position to a deployed position contacting a ground or paved surface to support the convertible trailer 100 while it is parked for loading. At least one tool drawer 34 may be located at the frame right side and/or the frame left side. A dovetail ramp 30 located at the frame rear has a first dovetail ramp portion pivotally mounted to a second dovetail ramp portion, the second dovetail ramp portion being mounted to or integral with the frame rear. The dovetail ramp 30 is constructed and arranged to outwardly pivot the first dovetail ramp portion to deploy the dovetail ramp 30 from the frame rear for use in loading the convertible trailer 100. A flip-top deck extension 32 has a flip-top deck top portion pivotally mounted to a flip-top deck bottom portion, wherein the flip-top deck top portion is configured to rest on the flip-top deck bottom portion when the flip-top deck extension 32 is not in use, and the flip-top deck top portion is level and coplanar with the lower deck 18 when deployed for use of the flip-top deck extension 32 to extend the usable length of the lower deck 18. When the lower deck 18 is in the first step deck position, the deployed flip-top deck top portion may rest on the undeployed dovetail ramp 30. Additional components of the convertible trailer 100 may include pins, rollers, and bushings permitting proper operation without unnecessary wear and tear; spring pins which return to an original set point; grease fittings permitting proper maintenance of a particular moving part; electrical lines and hoses providing a proper amount of electricity and a correct amount of air flow; over and under travel stops ensuring the convertible trailer 100 stops at a designated stopping place without damage; double inner and outer steel square slide components providing vertical and horizontal structural support of moving components; front slide catchers necessary for the complete structure of the moving convertible trailer 100 to maintain an ability to stay stationary in relation to another structure frame in front of the convertible trailer 100, such as a vehicle towing the convertible trailer 100; and an emergency stop button providing an operator a mechanism to stop all operation of the convertible trailer 100 in case of a mechanical or electrical malfunction.

The convertible trailer 100 and its components may be made of any suitable materials, and fabricated by any suitable process. A commercially available step deck trailer on a rolling chassis may be customized to provide the convertible trailer 100. The convertible trailer 100 and components may be made of welded steel or aluminum, and may have an inner support made of wood, aluminum, or steel. The convertible trailer 100 may have any size and dimensions, such as an overall length of 47 to 53 feet; an overall width of up to 102 inches, an upper deck length of 11 feet and height of 5 feet, and a lower deck length of 37 to 41 feet and height of 36 to 42 inches. In some embodiments, the convertible trailer 100 may have an overall length of 47 feet 10 inches, an overall width of 102 inches, an upper deck length of 10 feet and height of 49 inches, and a lower deck length of 37 feet 10 inches and height of 41 inches, wherein the height of a vertical section adjoining the planar horizontal upper deck and the planar horizontal lower deck (a slide rail for lower deck 18) may have a length of 20 inches. The weight range of the lower deck 18 may be between 7500 and 11000 pounds (between 7500 and 8000 for an aluminum deck, a middle weight range for a wood deck, and between 9500 and 11000 pounds for a steel deck).

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A convertible trailer constructed and arranged for conversion from a step deck trailer configuration to a flatbed trailer configuration, the convertible trailer having a trailer front, a trailer rear, a trailer right side, a trailer left side, a trailer top, and a trailer bottom, the convertible trailer comprising:
  a trailer frame having a frame front, a frame rear, a frame right side, a frame left side, a frame top, and a frame bottom;
  a plurality of wheel and axle assemblies supported on the trailer frame, wherein each wheel and axle assembly of the plurality of wheel and axle assemblies comprises a pair of wheels rotatably mounted on a respective axle;
  an upper deck located at the frame front of the trailer frame;
  a lower deck located rearward of the upper deck, the lower deck being constructed and arranged for vertical movement on a vertical slide rail from a first step deck position to a second raised flatbed position wherein the lower deck and the upper deck are coplanar;
  a controller operably connected to the lower deck, the controller being configured for actuation to move the lower deck upward and downward on the vertical slide rail with respect to the upper deck;
  at least one locking support beam extending from the frame right side to the frame left side; and
  a right landing gear mounted to an underside of the upper deck at the trailer right side and a left landing gear mounted to an underside of the upper deck at the trailer left side, the right landing gear and the left landing gear being deployable from a raised storage position to a deployed position contacting a ground or paved surface to support the convertible trailer while it is parked for loading.

2. The convertible trailer of claim 1, further comprising an air lift jack assembly operably connected to the controller, the lower deck, and the vertical slide rail, the air lift jack assembly being configured to raise the lower deck in response to actuation of the controller.

3. The convertible trailer of claim 2, further comprising an air pressure release valve operably connected to the controller, the lower deck, the vertical slide rail, and the air lift jack assembly, the air pressure release valve being configured to release air pressure in response to actuation by the controller to lower the lower deck.

4. The convertible trailer of claim 1, wherein at least one wheel and axle assembly of the plurality of wheel and axle assemblies further comprises an air lift wheel and axle assembly having a pair of air lift wheels rotatably mounted on an air lift axle configured to raise the pair of air lift wheels from a lowered wheel position permitting the pair of air lift wheels to contact a ground or paved surface to a raised wheel position.

5. The convertible trailer of claim 1, wherein at least one wheel and axle assembly of the plurality of wheel and axle assemblies further comprises an advancing axle assembly having an advancing axle configured for selective forward and backward movement of the pair of wheels rotatably mounted on the advancing axle between a rearward wheel position and a forward wheel position.

6. The convertible trailer of claim 1, wherein the plurality of wheel and axle assemblies comprises three wheel and axle assemblies.

7. The convertible trailer of claim 1, wherein the plurality of wheel and axle assemblies comprises four wheel and axle assemblies.

8. The convertible trailer of claim 1, wherein the at least one locking support beam comprises a plurality of locking support beams.

9. The convertible trailer of claim 8, wherein the plurality of locking support beams further comprises a right front locking support beam, a left front locking support beam, a right intermediate locking support beam, a left intermediate locking support beam, a right rear locking support beam, and a left rear locking support beam.

10. The convertible trailer of claim 1, further comprising at least one tool drawer located at the frame right side.

11. The convertible trailer of claim 1, further comprising at least one tool drawer located at the frame left side.

12. The convertible trailer of claim 1, further comprising a dovetail ramp located at the frame rear, the dovetail ramp comprising a first dovetail ramp portion pivotally mounted to a second dovetail ramp portion, the dovetail ramp being constructed and arranged to outwardly pivot the first dovetail ramp portion to deploy the dovetail ramp from the frame rear for use of the dovetail ramp for loading the convertible trailer.

13. The convertible trailer of claim 1, further comprising:
  a flip-top deck extension comprising a flip-top deck top portion pivotally mounted to a flip-top deck bottom portion;
  wherein the flip-top deck top portion is configured to rest on the flip-top deck bottom portion when the flip-top deck extension is not in use;
  wherein the flip-top deck top portion is level and coplanar with the lower deck when deployed to extend the lower deck; and
  wherein when the lower deck is in the first step deck position, the dovetail ramp is undeployed, and the flip-top deck extension is deployed, the flip-top deck top portion is adjacent to and rests on the undeployed dovetail ramp.

* * * * *